G. STREIT.
SCYTHE.
APPLICATION FILED DEC. 17, 1912.
1,102,814.
Patented July 7, 1914.
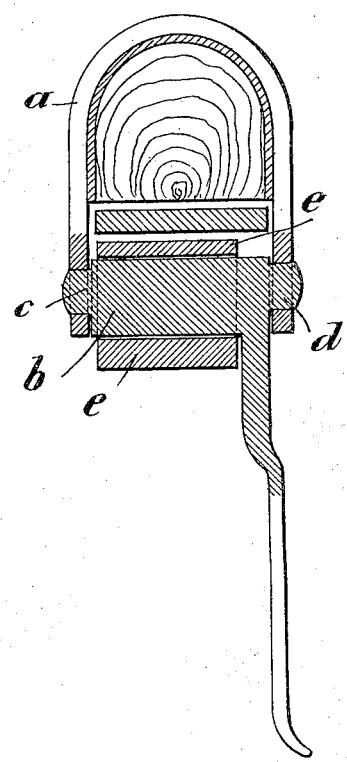
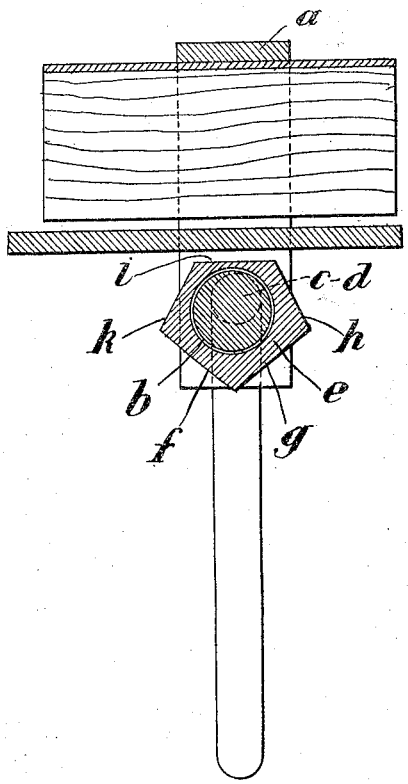
Witnesses
F. M. Meyer
E. E. Johansen
Inventor
Gabriel Streit
By [signature] Attorney

UNITED STATES PATENT OFFICE.

GABRIEL STREIT, OF STEISSLINGEN, BADEN, GERMANY.

SCYTHE.

1,102,814.  Specification of Letters Patent.  Patented July 7, 1914.

Application filed December 17, 1912. Serial No. 737,264.

*To all whom it may concern:*

Be it known that I, GABRIEL STREIT, a subject of the Emperor of Germany, and resident at Steisslingen, Baden, Germany, have invented certain new and useful Improvements in Scythes.

My present invention relates to certain new and useful improvements in scythes and more particularly to fastening rings or attachments serving to fasten winnowing rakes or the like to scythes, and it has for its object to provide an improved fastening ring, comprising inner and outer eccentric members, adapted to fasten rakes of any size through the agency of comparatively large bearing surfaces without it being necessary to have fastening rings of various sizes.

My invention permits of dispensing with special fastening devices, such as those used heretofore and which the operator loses very easily so that he cannot use them when he wants to fasten the attachments.

My invention will be readily understood from the following description taken in connection with the accompanying drawing, wherein:

Figure 1.— is a front sectional view and Fig. 2.— is a longitudinal section of a fastening ring embodying my invention.

The fastening ring is formed of the well-known yoke $a$ carrying an eccentric roller $b$ journaled at $c$ and $d$ in the ends of said yoke $a$. Arranged around said eccentric roller $b$ is an eccentric sleeve $e$, the axis of which is located eccentrically with relation to the center, for the purpose of arranging the bearing surfaces $f$, $g$, $h$, $i$, and $k$, at different distances from the axis whereby one form of fastening ring may be used for any size of shaft, without requiring any change to be made.

The operation of the eccentric fastening member is clearly shown in Fig. 2. In this view, the bearing surface $i$ bears against the device to be fastened, but there remains sufficient space between the latter and said bearing surface, for preventing the eccentric roller from tightening the parts firmly together as required. To this end, another bearing surface, say $h$, or $g$ must be brought against the part to be tightened, because said surface $h$ or $g$ is arranged at greater distance from the center of the member and therefore enables the parts to be firmly tightened together.

I claim:

1. An improved fastening ring for scythes, comprising in combination a yoke, an eccentric roller journaled in the ends of said yoke and an eccentric mounted on said roller, substantially as set forth.

2. An improved fastening ring for scythes, comprising in combination a yoke, an eccentric roller journaled between the ends of said yoke, an eccentric sleeve around said roller, and bearing surfaces on said sleeve and arranged at different distances from the center of the eccentric roller, substantially as and for the purpose set forth.

3. An improved fastening ring for scythes, comprising in combination a yoke an eccentric roller journaled between the ends of said yoke, an eccentric sleeve around said roller, and flat bearing surfaces on said sleeve, said surfaces being arranged at different distances from the center of the eccentric roller, substantially as set forth.

In testimony whereof I have hereunto set my hand in presence of two witnesses.

GABRIEL STREIT.

Witnesses:
 FRIDA KLAIBES,
 PAULINE MÜLLER.